United States Patent
Wagner

(10) Patent No.: US 11,586,449 B2
(45) Date of Patent: Feb. 21, 2023

(54) METHOD AND APPARATUS FOR BIDIRECTIONAL CONTROL CONNECTING HARDWARE DEVICE ACTION WITH URL-BASED WEB NAVIGATION

(71) Applicant: Roger Wagner, El Cajon, CA (US)

(72) Inventor: Roger Wagner, El Cajon, CA (US)

( * ) Notice: Subject to any disclaimer, the term of this patent is extended or adjusted under 35 U.S.C. 154(b) by 0 days.

(21) Appl. No.: 17/243,962

(22) Filed: Apr. 29, 2021

(65) Prior Publication Data

US 2021/0318892 A1 Oct. 14, 2021

Related U.S. Application Data

(63) Continuation of application No. 15/870,551, filed on Jan. 12, 2018, now Pat. No. 11,023,252.

(Continued)

(51) Int. Cl.

| | |
|---|---|
| *G06F 9/445* | (2018.01) |
| *G06F 16/954* | (2019.01) |
| *G06F 16/955* | (2019.01) |
| *G06F 9/4401* | (2018.01) |
| *G05B 15/02* | (2006.01) |

(Continued)

(52) U.S. Cl.
CPC ......... *G06F 9/44505* (2013.01); *G05B 15/02* (2013.01); *G06F 9/4411* (2013.01); *G06F 16/954* (2019.01); *G06F 16/9566* (2019.01); *H04L 12/2816* (2013.01); *H04L 67/125* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 7,062,475 B1 | 6/2006 | Szabo et al. | |
| 7,400,316 B2 * | 7/2008 | Appleyard | G06F 3/14 345/157 |

(Continued)

OTHER PUBLICATIONS

Wagner, U.S. Appl. No. 15/870,563, filed Jan. 12, 2018.
Wagner, U.S. Appl. No. 15/870,551, filed Jan. 12, 2018.

*Primary Examiner* — Howard Cortes
(74) *Attorney, Agent, or Firm* — Knobbe, Martens, Olson & Bear, LLP

(57) ABSTRACT

Systems, methods, and apparatuses for associating digital media with physical device. A method for controlling a hardware state input based on uniform resource locator (URL) data can include identifying URL data associated with a web browser, comparing the identified URL data to stored URL data, identifying stored hardware device data based on the comparison, generating a control signal based on the determined hardware device data, and/or transmitting the control signal to a microcontroller communicatively coupled to a hardware device. The microcontroller can adjust a hardware state of the hardware device based on the received control signal. A method for navigating to a URL location based on hardware device data can include receiving hardware device data from a microcontroller communicatively coupled to a hardware device, comparing the received hardware device data with stored hardware device data, identifying URL data based on the comparison, and causing a browser to navigate to a URL location based on the URL data.

17 Claims, 10 Drawing Sheets

Related U.S. Application Data

(60) Provisional application No. 62/445,410, filed on Jan. 12, 2017.

(51) Int. Cl.
*H04L 12/28* (2006.01)
*H04L 67/125* (2022.01)
*H04L 67/025* (2022.01)

(56) References Cited

U.S. PATENT DOCUMENTS

| | | | |
|---|---|---|---|
| 8,797,358 B1 * | 8/2014 | Tseng | G09G 5/00 |
| | | | 345/649 |
| 9,119,236 B1 * | 8/2015 | Martin | H04L 41/22 |
| 9,348,820 B1 | 5/2016 | Cox | |
| 11,023,252 B2 * | 6/2021 | Wagner | G06F 16/954 |
| 2007/0219654 A1 | 9/2007 | Frink et al. | |
| 2007/0260677 A1 | 11/2007 | DeMarco et al. | |
| 2008/0243793 A1 | 10/2008 | Hallett et al. | |
| 2010/0106319 A1 | 4/2010 | Grohman et al. | |
| 2010/0145479 A1 * | 6/2010 | Griffiths | H04L 67/12 |
| | | | 700/17 |
| 2010/0175102 A1 | 7/2010 | Kaung | |
| 2010/0268573 A1 | 10/2010 | Jain et al. | |
| 2011/0138354 A1 | 6/2011 | Hertenstein | |
| 2011/0154375 A1 | 6/2011 | Helal | |
| 2012/0136485 A1 | 5/2012 | Weber et al. | |
| 2012/0302336 A1 | 11/2012 | Garza | |
| 2012/0304062 A1 | 11/2012 | Schultz et al. | |
| 2013/0007192 A1 | 1/2013 | Schmidt | |
| 2013/0050958 A1 | 2/2013 | Bdeir | |
| 2013/0232402 A1 * | 9/2013 | Lu | G06F 40/143 |
| | | | 719/318 |
| 2013/0278777 A1 | 10/2013 | Sweet, III et al. | |
| 2013/0283170 A1 | 10/2013 | Penner | |
| 2013/0321268 A1 * | 12/2013 | Tuck | G06F 3/0484 |
| | | | 345/157 |
| 2014/0039654 A1 | 2/2014 | Akiyama et al. | |
| 2014/0059444 A1 | 2/2014 | Yun | |
| 2014/0123187 A1 | 5/2014 | Reisman | |
| 2014/0265920 A1 | 9/2014 | Pederson | |
| 2014/0268920 A1 | 9/2014 | Fang | |
| 2014/0297804 A1 | 10/2014 | Shivadas et al. | |
| 2015/0100984 A1 | 4/2015 | Hsiung | |
| 2015/0172151 A1 * | 6/2015 | Bottalico | H04L 67/02 |
| | | | 709/224 |
| 2015/0339277 A1 | 11/2015 | Pou | |
| 2016/0042620 A1 | 2/2016 | Dandie et al. | |
| 2016/0048861 A1 * | 2/2016 | Morgaine | G06Q 30/0233 |
| | | | 705/14.16 |
| 2016/0149716 A1 | 5/2016 | Raj | |
| 2016/0155317 A1 * | 6/2016 | Rostami | H04B 17/14 |
| | | | 340/539.26 |
| 2016/0310049 A1 * | 10/2016 | Rowe | A61B 5/4875 |
| 2018/0176615 A1 | 6/2018 | Hannu et al. | |
| 2018/0203711 A1 | 7/2018 | Wagner | |
| 2018/0248878 A1 | 8/2018 | El-Moussa | |
| 2019/0108294 A1 | 4/2019 | Anderson | |

\* cited by examiner

US 11,586,449 B2

METHOD AND APPARATUS FOR BIDIRECTIONAL CONTROL CONNECTING HARDWARE DEVICE ACTION WITH URL-BASED WEB NAVIGATION

CROSS-REFERENCE TO RELATED APPLICATIONS

The present application is a continuation of U.S. patent application Ser. No. 15/870,551, entitled METHOD AND APPARATUS FOR BIDIRECTIONAL CONTROL CONNECTING HARDWARE DEVICE ACTION WITH URL-BASED WEB NAVIGATION, filed Jan. 12, 2018 which claims priority benefit to U.S. Provisional Application No. 62/445,410, entitled METHOD AND APPARATUS FOR BIDIRECTIONAL CONTROL CONNECTING HARDWARE DEVICE ACTION WITH URL-BASED WEB NAVIGATION, filed Jan. 12, 2017, which is hereby incorporated herein by reference in its entirety.

BACKGROUND

Various systems are available for controlling actions of a hardware device. For example, selectable content on a webpage or a computer program, such as a mobile app, designed to run on a mobile device may permit a user to turn on lights, control a thermostat, or the like. In addition, various systems are also available for controlling data displayed on a webpage. For example, a system can compile real-time temperature data from a thermostat or temperature sensor and can cause a portion of a web-page to continuously update with the real-time temperate.

BRIEF DESCRIPTION OF THE DRAWINGS

The following drawings and the associated descriptions are provided to illustrate embodiments of the present disclosure and do not limit the scope of the claims.

Figure 1A:
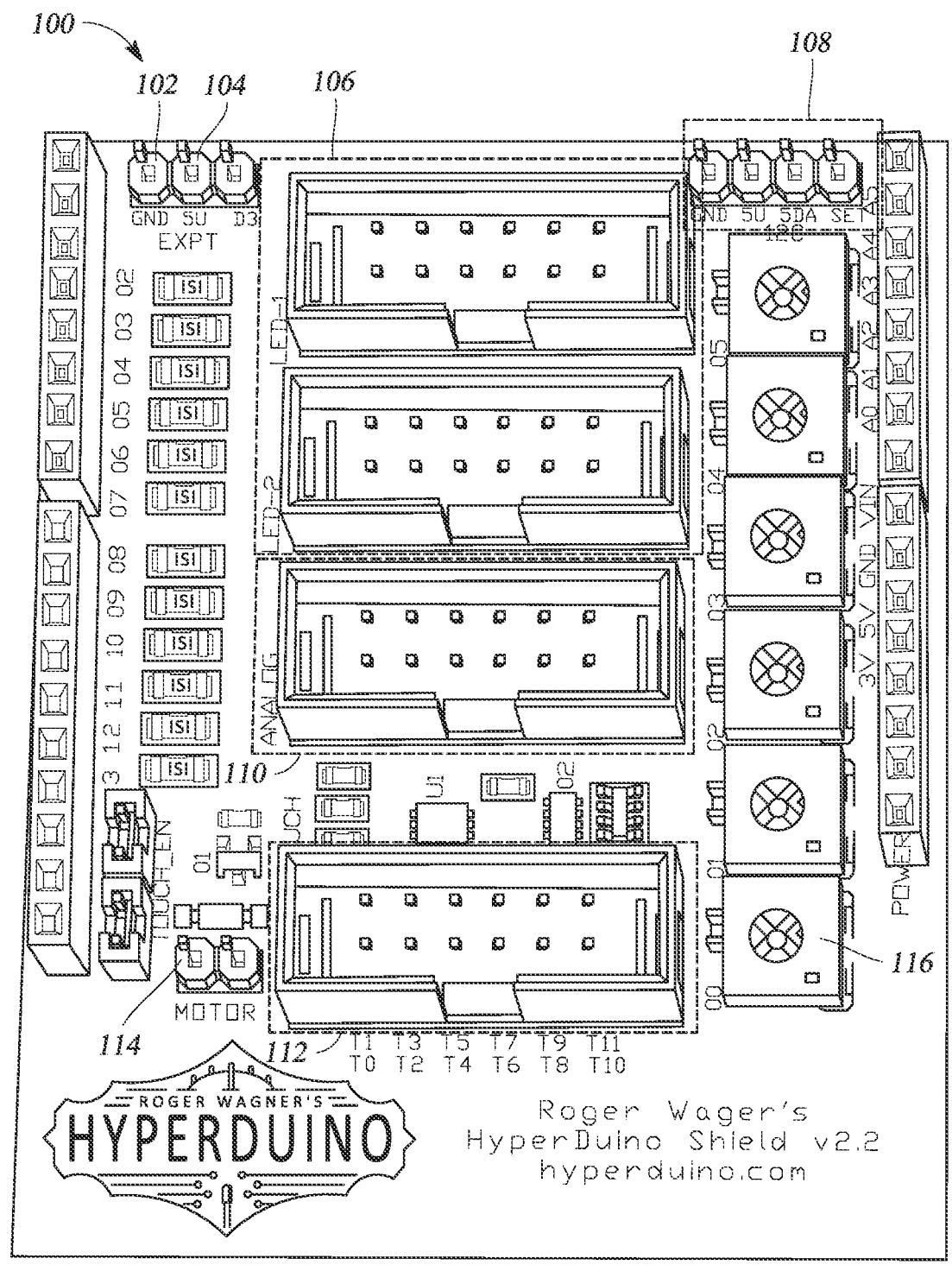
FIG. 1A illustrates an example of an add-on printed circuit board (PCB).

While the foregoing "Brief Description of the Drawings" references generally various embodiments of the disclosure, an artisan will recognize from the disclosure herein that such embodiments are not mutually exclusive. Rather, the artisan would recognize a myriad of combinations of some or all of such embodiments.

DETAILED DESCRIPTION

Adding digital media to a school project or museum exhibit presentation can significantly enhance a viewer's interest in the presentation, especially when the digital media is added in an interactive way. For example, rather than simply displaying a poster at a science fair, a student's project might pique more interests if he or she also displayed a video, in addition to the poster, of the student discussing the poster and/or describing the project. Furthermore, a viewer may be even more interested in the presentation if different parts of the poster were to light up during the different segments of the video. However, to many students, linking digital media (e.g., video, audio, the Internet, etc.) with a physical project (poster boards, dioramas, science fair projects, slide presentations) requires more effort than a student wants to put in and/or requires skills that are outside of the student's knowledge. This is because, conventionally, to link digital media with physical projects in an interactive way requires dedicated software or coding.

Various embodiments of systems and methods for easily and efficiently associating digital media with physical devices are disclosed. An environment includes a microcontroller in communication with a hardware device (such as an LED), and further includes a computing device (e.g., running a software application) in communication with the microcontroller as well as a browser.

Control of Hardware Device Based on URL Data

A computing device (non-limiting example: an application on the computing device such as Roger Wagner's HyperDuino for Chrome which is commercially available on the Chrome Web Store) can identify URL data (non-limiting example: a URL location) associated with an Internet browser. Using the identified URL data, the computing device can identify (e.g., from memory) hardware device data (non-limiting example: hardware state data corresponding to an analog or digital pin, or other input or output of the microcontroller) that is associated with the identified URL data. For example, a lookup table correlating hardware device data and URL data can be stored (e.g., via user input) in memory of the computing device. The computing device can determine whether the identified URL data matches any URL data stored in the lookup table. If the computing device determines that a match exists, the computing device can identify or retrieve hardware device data that corresponds to the matched URL data.

Using the identified or retrieved hardware device data, the computing device can generate a command (sometimes referred to as a control signal) and can (wirelessly or over a wired connection) communicate the command to a microcontroller (non-limiting example: Roger Wagner's HyperDuino which is commercially available at http://hyperduino.com/). Based on the received command, the microcontroller can control a hardware device to which it is connected, for example, by enabling or disabling a pin of the microcontroller or otherwise adjusting an output of the microcontroller. By enabling, disabling, or otherwise adjusting an output of the microcontroller, the microcontroller can cause the hardware device to perform an action that can include, but is not limited to, turning ON, turning OFF, enabling a measurement, activating an LED, a motor, a servomechanism, or a solenoid, playing a sound, adjusting settings of the hardware device, or the like.

Accordingly, a hardware device can be controlled based at least in part on URL data associated with an Internet browser.

Controlled URL Navigation Based on Hardware Device Data

A microcontroller (such as Roger Wagner's HyperDuino which is commercially available at http://hyperduino.com/,) can be communicatively coupled to a hardware device, and can identify or receive hardware device data from the hardware device. For example, the microcontroller can include analog pins, digital pins, or other input or outputs that can correspond to a hardware state (e.g., high, low, enabled, disabled, an analog value, a protocol, etc.) corresponding to the hardware device, and the microcontroller can wirelessly or through a wired connection communicate or report the hardware device data (e.g., a state or a value of one or more of its inputs or outputs) to a computing device (non-limiting example: an application running on the computing device).

The computing device receives the hardware device data from the microcontroller and based on the received hardware device data can identify URL data. For example, using the identified hardware device data, the computing device can identify (e.g., from memory) URL data that is associated with the identified hardware device data. For example, a lookup table correlating hardware device data and URL data can be stored in memory of the computing device (e.g., by a user). The computing device can determine whether the identified hardware device data matches any hardware device data stored in the lookup table. If the computing device determines that a match exists, the computing device can identify or retrieve URL data that corresponds to the matched hardware device data.

Using the identified URL data, the computing device can control a browser to navigate to a particular URL associated with the URL data. In addition, in some cases, the particular URL is associated with a video and the URL further includes video timing information. For example, the URL data may include an indication of a URL associated with a YouTube video as well as an indication to start the video at a particular time stamp of the video, such as at 32 seconds.

Accordingly, a computing device can cause a browser to navigate to a particular URL based at least in part on hardware device data associated with a hardware device.

Example Circuit Board Overview

FIG. 1A illustrates an example of an add-on printed circuit board (PCB) 100 configured to interface with a microcontroller to extend the microcontroller's capabilities or ease of use. For example, the add-on PCB 100 (sometimes referred to as a piggy-back board or a shield) can simplify a connection to hardware elements (such as LEDs, photocells, sensors, actuators, or the like), thereby allowing a student (or other user) to easily control hardware devices, such as those hardware devices intended to be used with a physical or digital project.

Figure 1B:
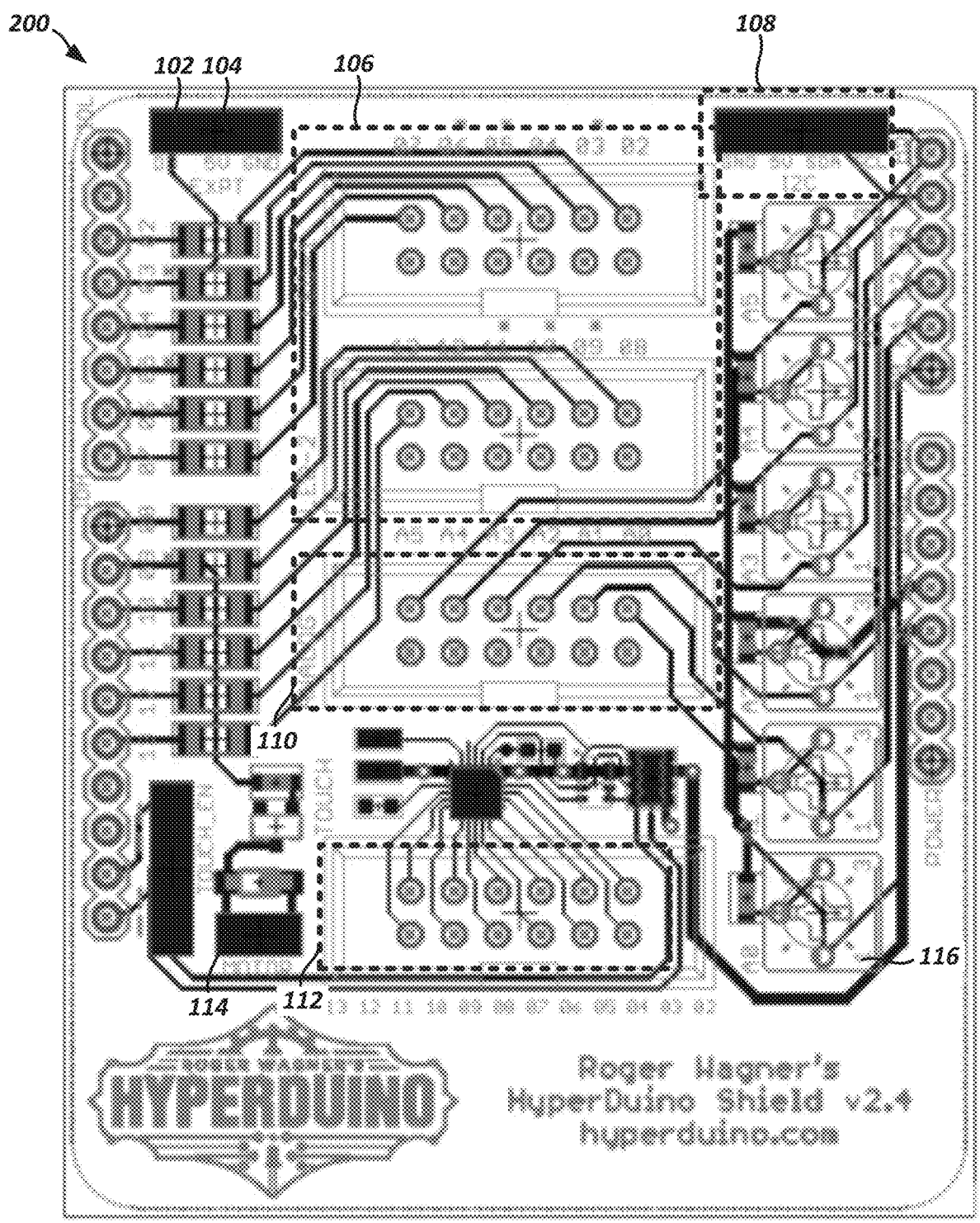
FIG. 1B illustrates an example of a layout of an add-on PCB.

FIG. 1B illustrates an example of a layout of the add-on PCB 100. As illustrated in FIGS. 1A-1B, the add-on PCB 100 can include, but is not limited to, connections corresponding to many of the inputs or outputs of the microcontroller. For example, the PCB 100 includes connections for ground 102, power (5 volts) 104, I/O pins 106 (for example, for LED connections), analog pins 110 (for example, for photocell connections), touch sensor pins 112 (for example, for touch sensor connections), motor connections 114, and potentiometers 116 (sometimes called trimmers or trim pot), among other connections.

The add-on PCB 100 can interface with various microcontrollers. For example, the add-on PCB 100 can interface with an Arduino microcontroller, such as the Arduino Uno R3 or the Funduino. The Arduino Uno has 14 digital input/output pins (of which 6 can be used as PWM outputs), 6 analog inputs, a 16 MHz crystal oscillator, a USB connection, a power jack, an ICSP header, and a reset button. In some cases, the add-on PCB 100 can provide a connection for (and in some cases, can duplicate) one or more of these microcontroller connections. In some cases, the add-on PCB 100 can alternatively interface with a non-Arduino microcontroller, such Raspberry Pi. For example, when combined with an Arduino shield connection bridge, such as the Raspduino the Arduberry, the add-on PCB 100 can connect to various non-Arduino microcontrollers.

Environment Overview

Figure 2:
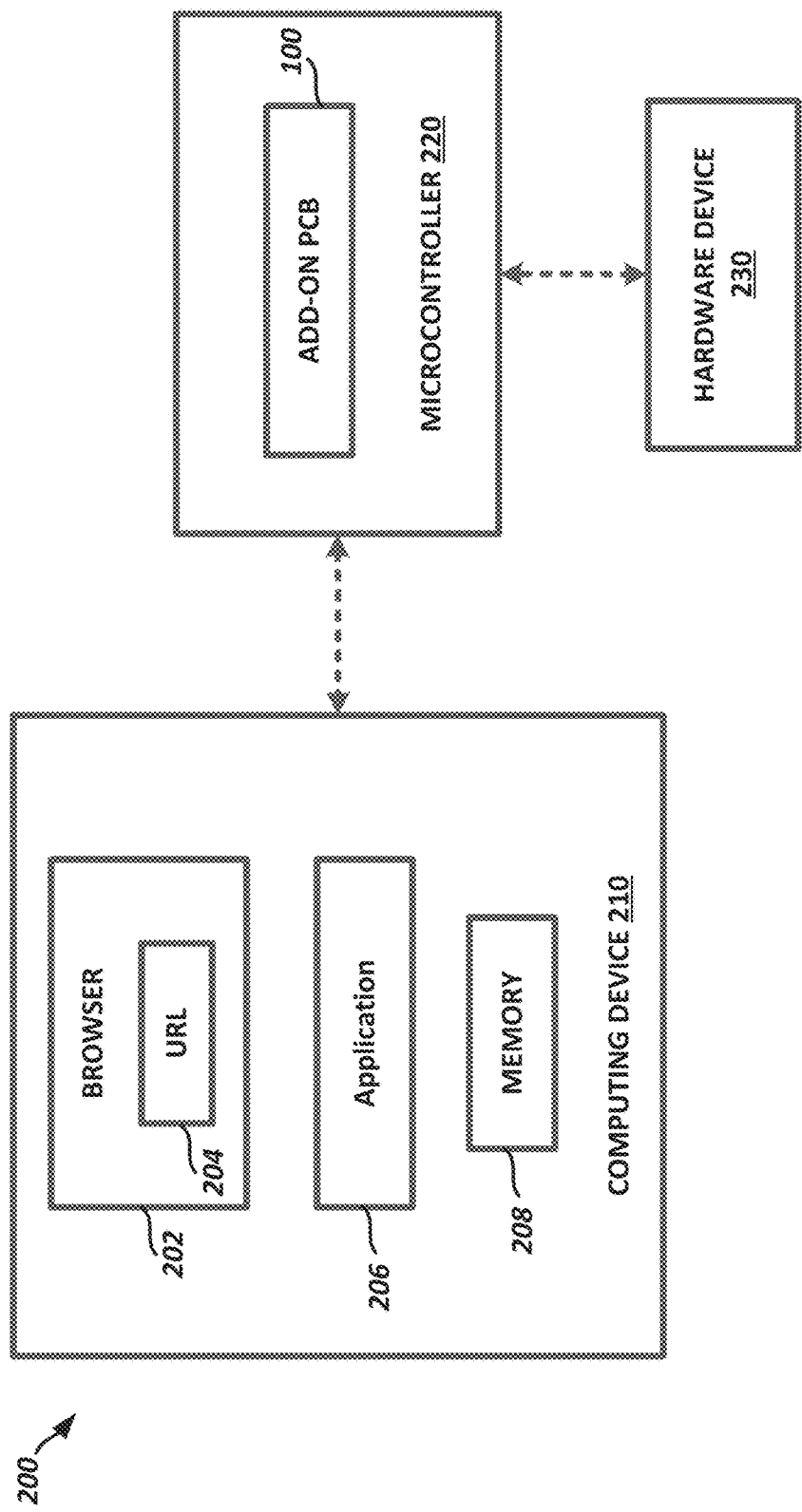
FIG. 2 is a block diagram illustrative of an embodiment of an environment for linking a hardware device with a URL location.

FIG. 2 is a block diagram illustrative of an embodiment of an environment 200 for linking a hardware device 230 with a URL 204. In the illustrated embodiment, the environment 200 includes a hardware device 230, a microcontroller 220, and a computing device 210 capable of accessing the Internet via browser 202. The computing device includes a memory 208 and can communicate with the microcontroller 220. The microcontroller 220 is also communicatively coupled to the hardware device 230.

As described herein, the environment 200 can include one or more of various hardware devices 230. For example, a hardware device can an LED, a motor, a thermistor, a thermometer, a camera, a servomechanism, a solenoid, a button, a buzzer, an audio device, a microphone, or any other hardware device capable of being at least partially controlled a microcontroller. In addition or alternatively, the hardware device 412 can include a device configured to obtain measurements such as voltage, current, resistance, conductance, temperature, humidity, sound, pH, magnetism, speed or acceleration.

The computing device can include an application 206 such as computer-executable instructions that when executed by a processor of the computing device 210 cause the processor to perform a number of functions, programs, applications, and/or services. For example, the application 206 can communicate with the browser 202 to control the URL 204. In addition, the application 206 can communicate with the microcontroller 220 to control one or more inputs or outputs of the microcontroller 220. The computing device 210 can also include a transceiver and an antenna to provide wireless communication, as well as a screen, input and output components, etc.

The computing device 210 can be implemented using one or more of a computer, laptop, cell phone, smart phone, tablet, mobile computing device, or any other electronic device configured to access the Internet. The computing device 210 includes a web browser 202 configured to navigate to a plurality of URLs 204 for retrieving, presenting and traversing information resources on the World Wide Web.

The computing device 210 can include local or remote memory 208 that can have stored URL data and hardware device data. In some cases, the URL data and hardware device data are stored in an electronic lookup table.

The URL data can include, but is not limited to, a URL location (sometimes referred to as a web address), a range of URLs (non-limiting example: a range corresponding to an area on a digital map), a web address identifier (non-limiting examples: a string of characters corresponding to a URL location, or a portion of a URL such as a protocol identifier, a subdomain identifier, a domain name identifier, a port identifier, a path identifier, a query identifier, parameter identifier, fragment identifier), or additional URL information (non-limiting examples: timing of a video corresponding to a URL location, a radius or region around a point on a digital map corresponding to a URL location, a length of time since navigating away from a particular web address, a length of time since navigating to a particular web address, a length of time on a webpage or using a web address, an indication of a change in URL).

The hardware device data can include, but is not limited, hardware state data (sometimes referred to as action data), measurand data, or hardware device identifying data, such as a unique hardware device indicator. The hardware state data can include an indication of a digital value (e.g., high, low, enable, disable), an analog value, or other value associated with an input or output (e.g., digital pin, analog pin, touch sensor pin, potentiometer, a protocol) of a microcontroller. The measurand data can include one or more indications or values associated with a measurement or function of a hardware device such as voltage data (e.g., a voltage of the hardware device or a voltage measured by the hardware device). Similarly, the measurand data can include current data, resistance data, conductance data, temperature data, humidity data, sound data, pH data, magnetism data, or speed or acceleration data. In some cases, the measurand data can include a range of data (e.g., a range of 1 to 5).

Example Environment

Figure 3:
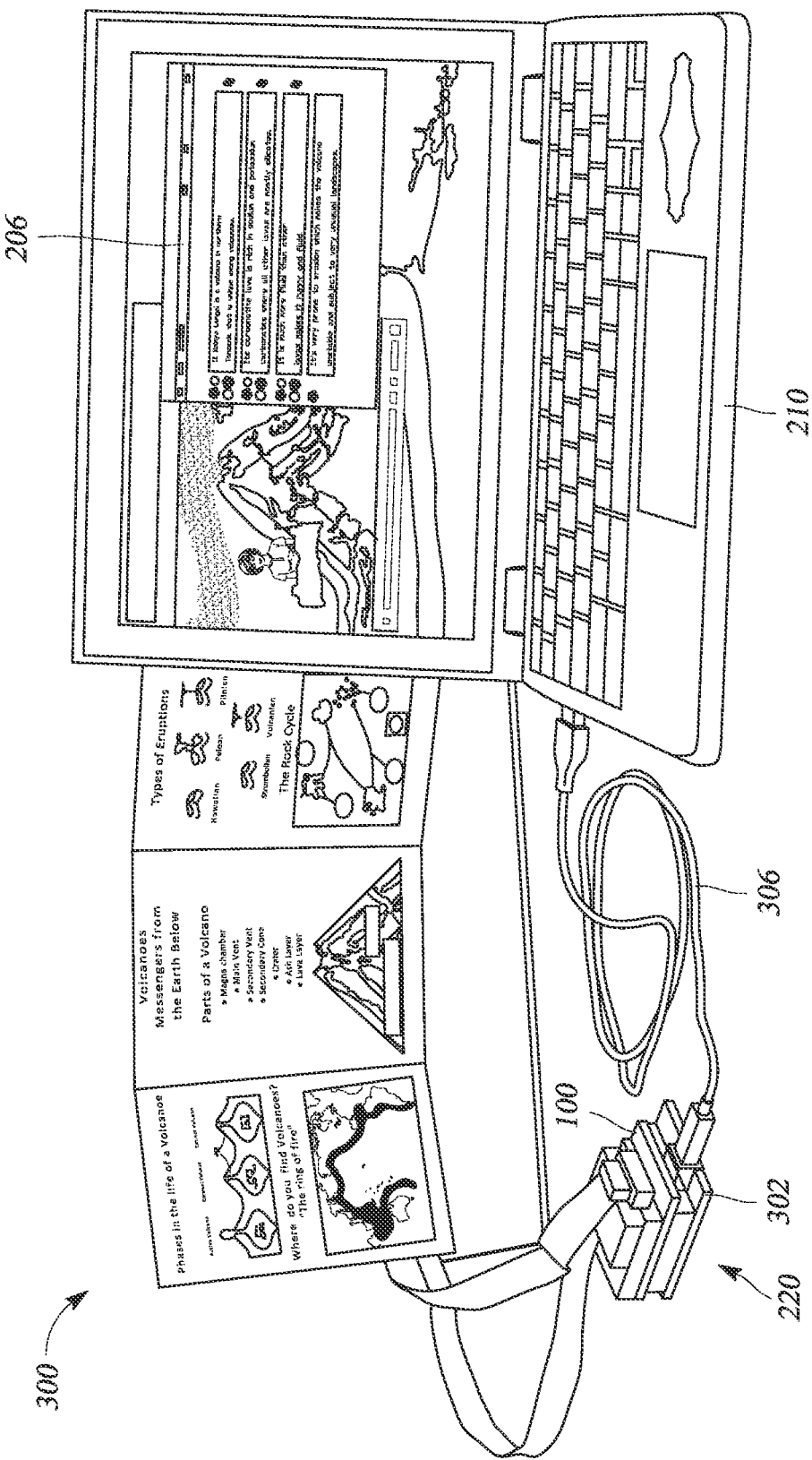
FIG. 3 includes an example environment for linking URL data associated with a URL location and hardware device data associated with a hardware device.

FIG. 3 includes an example environment 300 for linking URL data associated with a URL location and hardware device data associated with a hardware device. As illustrated, the system 300 includes a computing device 210 and a microcontroller 220 connected via USB cable 306. In this example, the computing device 210 is running an application 206 and is configured to access the Internet using a web browser.

The application 206, which can include Roger Wagner's HyperDuino for Chrome app, can monitor URL data associated with the web browser and can additionally monitor hardware device data associated with the microcontroller 220. Based on identified URL data, the application 206 can cause changes in hardware device data associated with the microcontroller 220. Similarly, based on identified hardware device data, the application can cause a browser to navigate to a particular URL associated with the URL data.

The application 206 can include a lookup table that associates particular URL data and particular hardware device data. In some cases, at least some data in the lookup table can be entered into the application 206 by a user of the computing device 210. For example, as described in more detail with respect FIGS. 6-7C, the application 206 can include selectable content corresponding to one or more of the inputs or outputs of the microcontroller 220 (e.g., Pin 2, Pin 3, Pin 4, etc.). A user can select an input or output of the microcontroller 220 that the user wishes to associate with a URL. In addition, the user can identify a URL that the user wishes to associate with the selected input or output, and an action (e.g., hardware state) that the user wishes to be taken (e.g., navigate to the URL, set PIN 6 to low, etc.)

As a non-limiting example, the application 206 includes a lookup table that associates a "high" state of Pin 2 with URL location "http://hyperduino.com". Accordingly, the application monitors the browser, and based on a determination that the browser navigated to "http://hyperduino.com," the application can cause PIN 2 to go high (thereby activating a hardware device such as an LED). Similarly, the application 206 monitors hardware device data associated with the microcontroller 220, and based on a determination that Pin 02 is high (e.g., corresponding to the press of a button), the application 206 can cause the browser to navigate to http://hyperduino.com.

Figure 4:
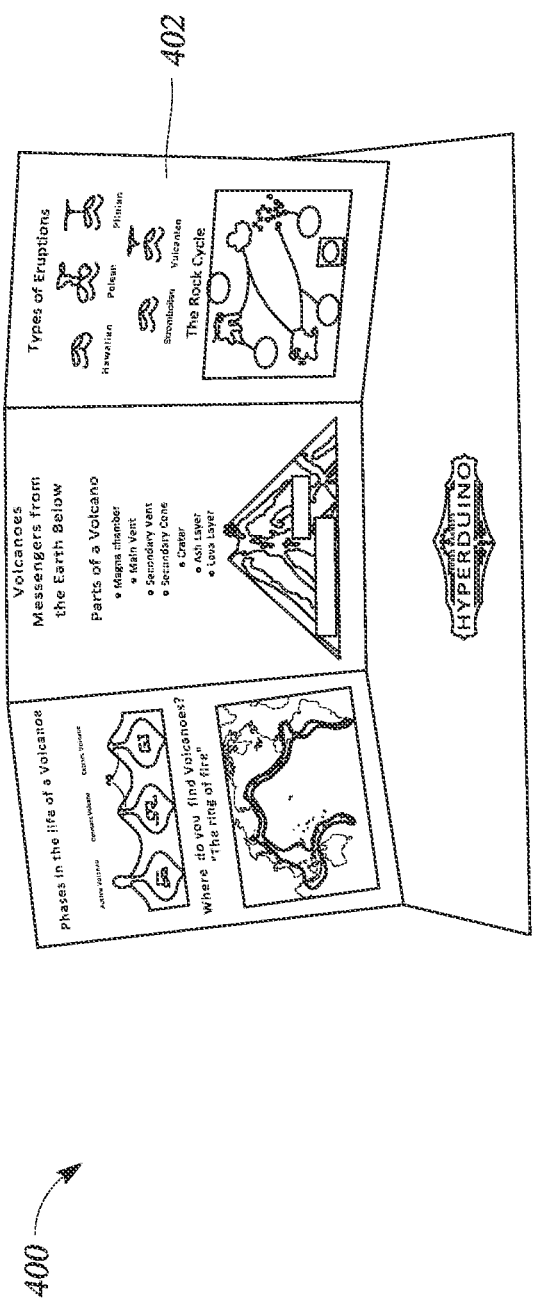
FIG. 4 illustrates an example kit 400 corresponding to the environment of FIG. 3.
Figure 4:
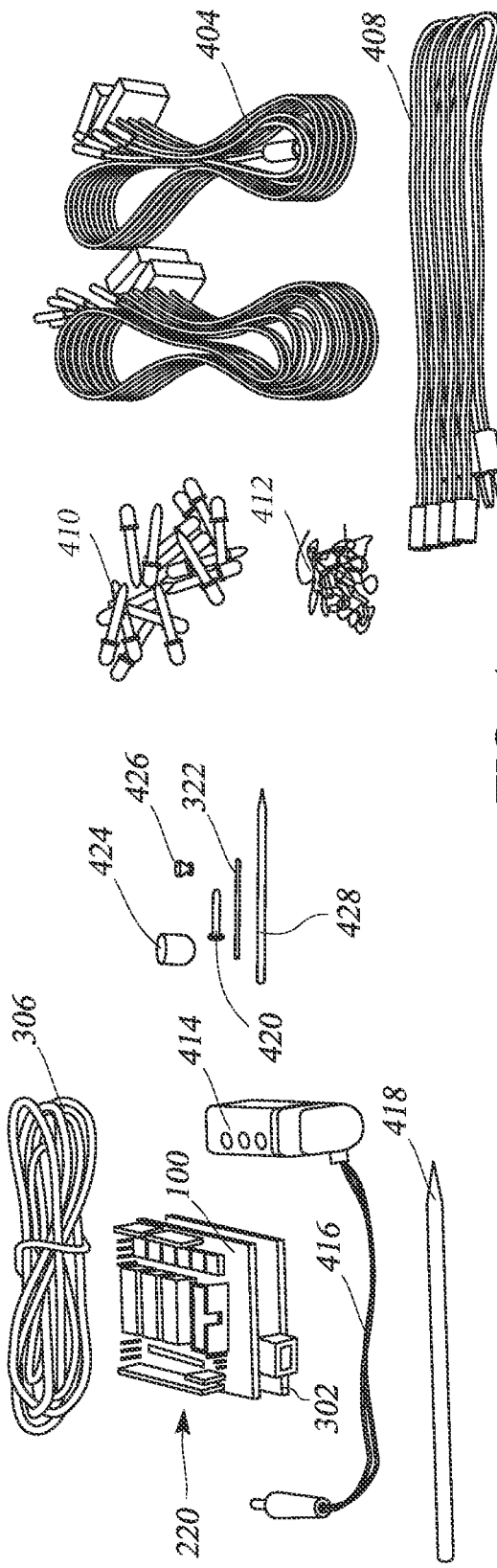

FIG. 4 illustrates an example kit 400 corresponding to the environment of FIG. 3. As illustrated, the kit 400 can include a combination of one or more of a sample mini tri-fold model 402, a microcontroller (e.g., add-on PCB 100 and microcontroller 220), a USB cable 306, a foam pad (not pictured) to insulate the underside of the microcontroller 220, LED rainbow ribbons easy-connect cables 404, touch sensor rainbow ribbon easy-connect cables 408, LEDs 410 (for example, red, green, yellow and blue LEDs, multi-color flashing LEDs), RGB LED 428, touchpoints 412 for touch sensing 312, a battery 414 (for example, a 9 volt battery), a battery connecting clip 416, a hole-making tool 418 for LEDs, a photocell (light) sensor 420, a temperature sensor (thermistor) 422, a buzzer 424, and a pushbutton switch 426.

In some cases, the kit 300 can additionally or alternatively include a small motor (not pictured), a servomechanism (not pictured), a 2-conductor dual socket connecting wire for motors (not pictured), a 3-conductor dual pins connecting wire for servomechanisms (not pictured), or various other hardware devices or connecting components.

Figure 5:
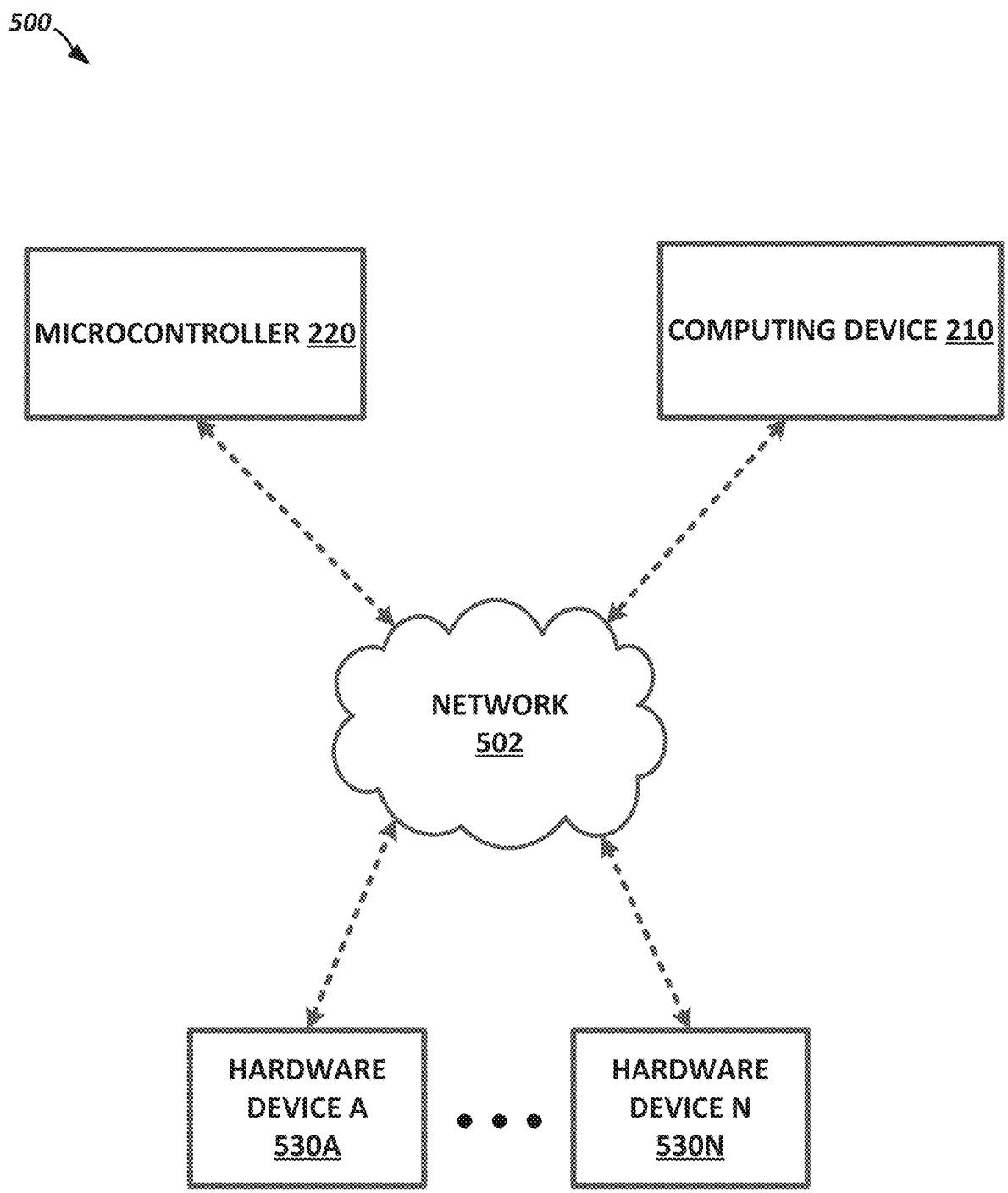
FIG. 5 is a block diagram illustrative of an embodiment of an environment for linking, over a network, one or more hardware devices with URL navigation of a computing device.

FIG. 5 is a block diagram illustrative of an embodiment of an environment 500 for linking, over a network 502, one or more hardware devices 530A-530N with URL navigation of a computing device 210. Similar to as described with respect to FIG. 1, the environment 500 includes a hardware device 530A-530N, a microcontroller 220, and a computing device 210. In addition, the computing device 210, the microcontroller 220, and the hardware devices 530A-530N are configured to communicate over network 502.

The network 320 can be implemented as one or more various networks including, but not limited to, a local-area network (LAN), a wide-area network (WAN), a campus-area network (CAN), a metropolitan-area network (MAN), a home-area network (HAN) or the like. The network 320 can be a public or private network.

Although the components are illustrated as each communicating over the network 502, in some cases, one or more of the components 220, 210, 520A-530N are configured to communicate directly without using the network (for example, as described with respect to FIG. 2). For example, in some cases, the microcontroller 220 is connected to the hardware devices 530A-530N via a USB connection and is connected to the computing device 210 over the network 502. As another example, the microcontroller 220 can be connected to the computing device 210 via wired connection and can be connected to the hardware devices 530A-530N over the network 502.

Example User Interface

Figure 6:
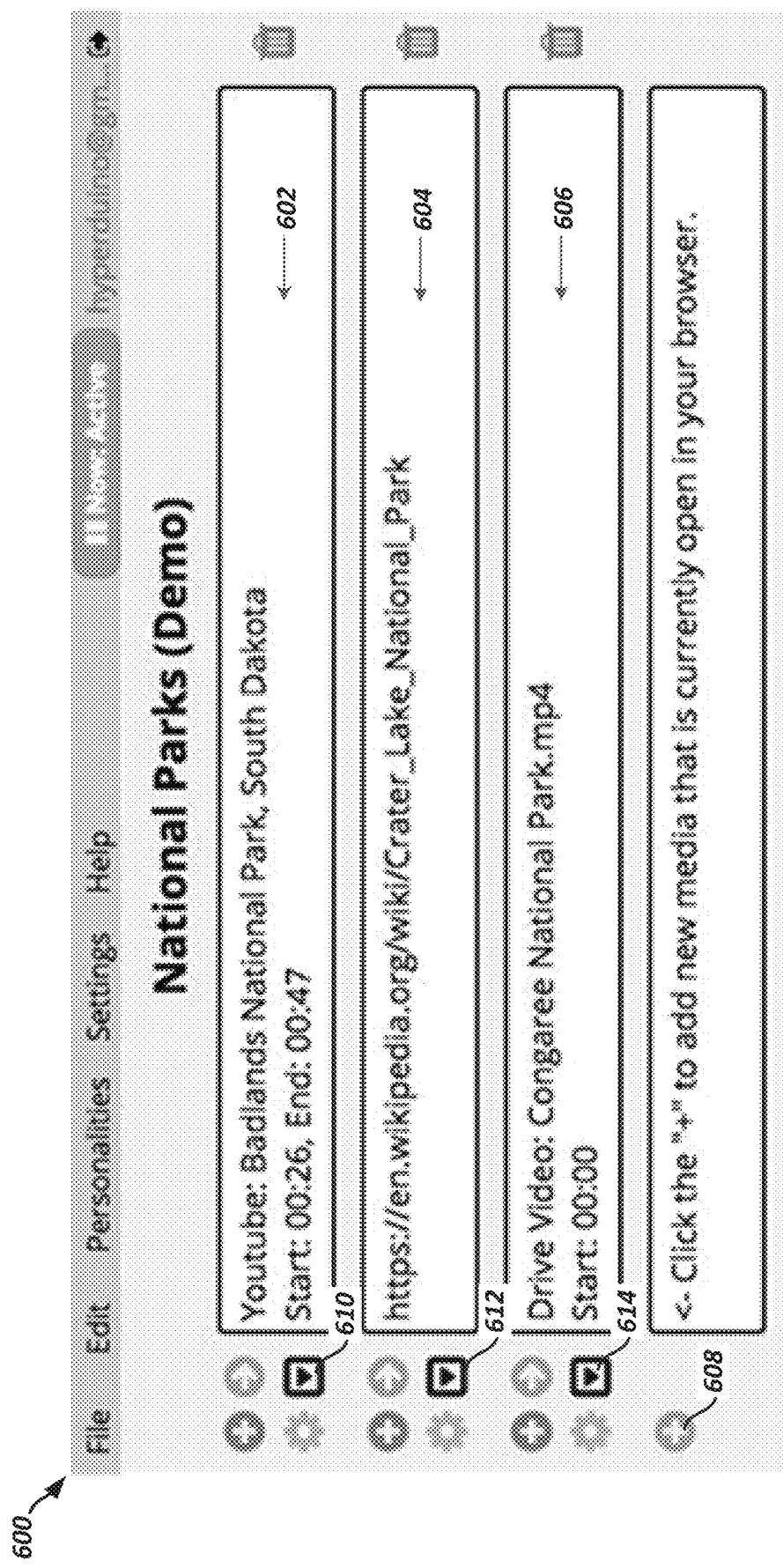
FIG. 6 illustrates an example User Interface (UI) of an application connecting web-based media with a hardware device.

FIG. 6 illustrates an example User Interface (UI) 600 of an application connecting web-based media with a hardware device. The application can be an embodiment of application 206 of FIG. 2. As illustrated, the UI 600 illustrates a screen entitled "National Parks (Demo)" and includes three playlist items (sometimes referred to as information for a lookup table).

The first playlist item 602 (as illustrated in more detail in FIG. 7A) corresponds to a touch sensor and web-based video on youtube.com. More specifically, for the first playlist item 602, the application monitors an input of the microcontroller that is associated a touch sensor (e.g., touch sensor #2). When the application determines that the touch sensor was touched (e.g., by monitoring hardware device data it receives from the microcontroller), the application controls a browser to navigate to a URL for a Badlands National Park video on YouTube and play just the section from 0:26 to 0:47 seconds.

Furthermore, the first playlist item 602 is also associated with an LED (e.g., LED #2) that the application will turn ON (e.g., set an output high) the when the Badlands National Park video starts at 0:26 seconds and will turn OFF (e.g., set the output low) when the content of the browser window leaves this video or when the video is played past 0:47 seconds. In some cases, rather the playlist may be configured to cause the LED to turn OFF "At End of Content." That is to say, when a user touches the touch sensor, and the video plays, the LED will turn off at the end the video.

The second playlist item 604 (as illustrated in more detail in FIG. 7B) corresponds to a touch sensor and web-based URL location. More specifically, for the second playlist item 604, the application monitors an input of the microcontroller that is associated a touch sensor (e.g., touch sensor #3). When the application determines that the touch sensor was touched (e.g., by monitoring hardware device data it receives from the microcontroller), the application controls a browser to navigate to a URL for a Wikipedia page for Crater Lake National Park. Accordingly, the application can be used to navigate to static web page content, as well as videos (see the first playlist).

Furthermore, the second playlist item 604 is also associated with an LED (e.g., LED #3) that the application will turn ON (e.g., set an output high) the when the Wikipedia web page is navigated to and will turn OFF (e.g., set the output low) when the content of the browser window leaves this webpages (for example, in response to another touch sensor being touched).

The third playlist item 606 (as illustrated in more detail in FIG. 7C) corresponds to a touch sensor and a URL for a video stored in Google Drive. More specifically, for the third playlist item 606, the application monitors an input of the microcontroller that is associated a touch sensor (e.g., touch sensor #4). When the application determines that the touch sensor was touched (e.g., by monitoring hardware device data it receives from the microcontroller), the application controls a browser to navigate to a URL for a Congaree National Park video stored in a Google Drive and the entire video plays.

Furthermore, the third playlist item 606 is also associated with an LED (e.g., LED #4) that the application will turn ON (e.g., set an output high) the when the video starts and will turn OFF (e.g., set the output low) when the content of the browser window leaves the video.

In addition to the first, second, and third playlist items 602, 604, 606, a user may create a new playlist item by selecting the "+" 608. To create a new playlist item, the user can add new media (such as media that is currently open in the user's browser), select new actions (e.g., what to do at "arriving at content," "leaving content," or "end of content"), and can also select which "input to respond to" (e.g., which pin of the microprocessor).

Figure 7A:
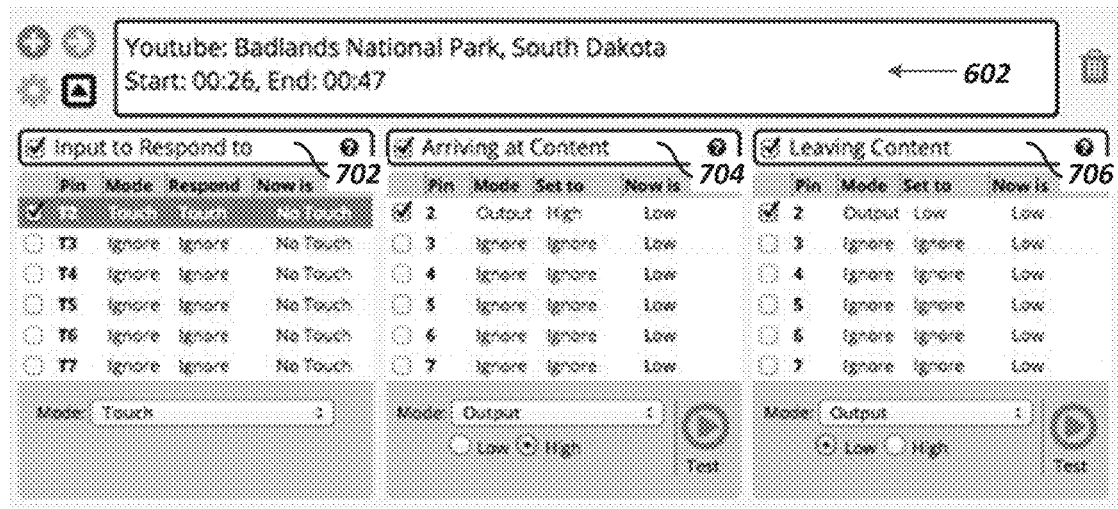
FIGS. 7A-7C illustrate additional detail associated with each of the playlist items of FIG. 6.
Figure 7B:
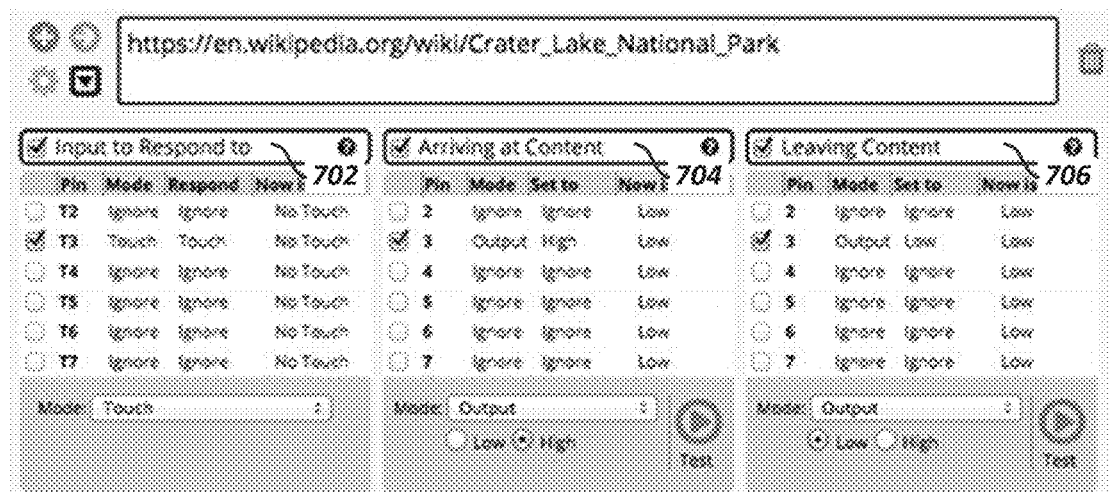
Figure 7C:
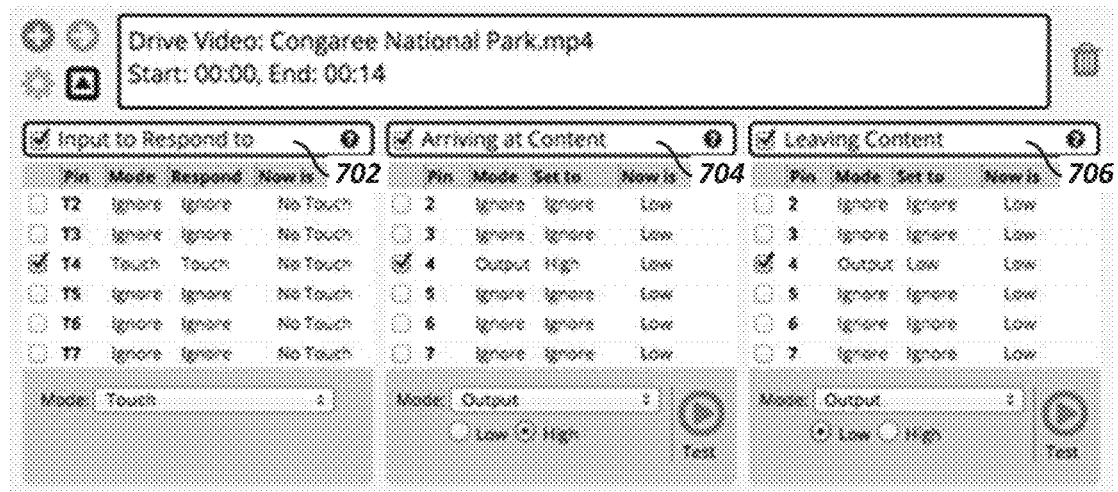

FIGS. 7A-7C illustrate additional detail associated with each of the playlist items 602, 604, 606 of FIG. 6. As illustrated, the additional detail for the playlist items can include sections of information such as "Input to Respond to" 702, "Arriving at Content" 704, "Leaving Content" 706, or "End of Content." Further, the sections can include selection criteria including a selectable box corresponding to a row, columns for "Pin" (which corresponds to a pin of a microcontroller), "Mode" (which corresponds to whether the item will be an input or output of the system), "Respond," "Set to" (which corresponds to the action to be taken or how the adjust the pin of the controller), and "Now Is" (corresponding to a current state of an associated pin), and drop-down selection for "mode." Further, some sections include additional options to select "low" or "high" output, as well as an option to test the output.

Controlling a Hardware State Based on a URL Location

Figure 8:
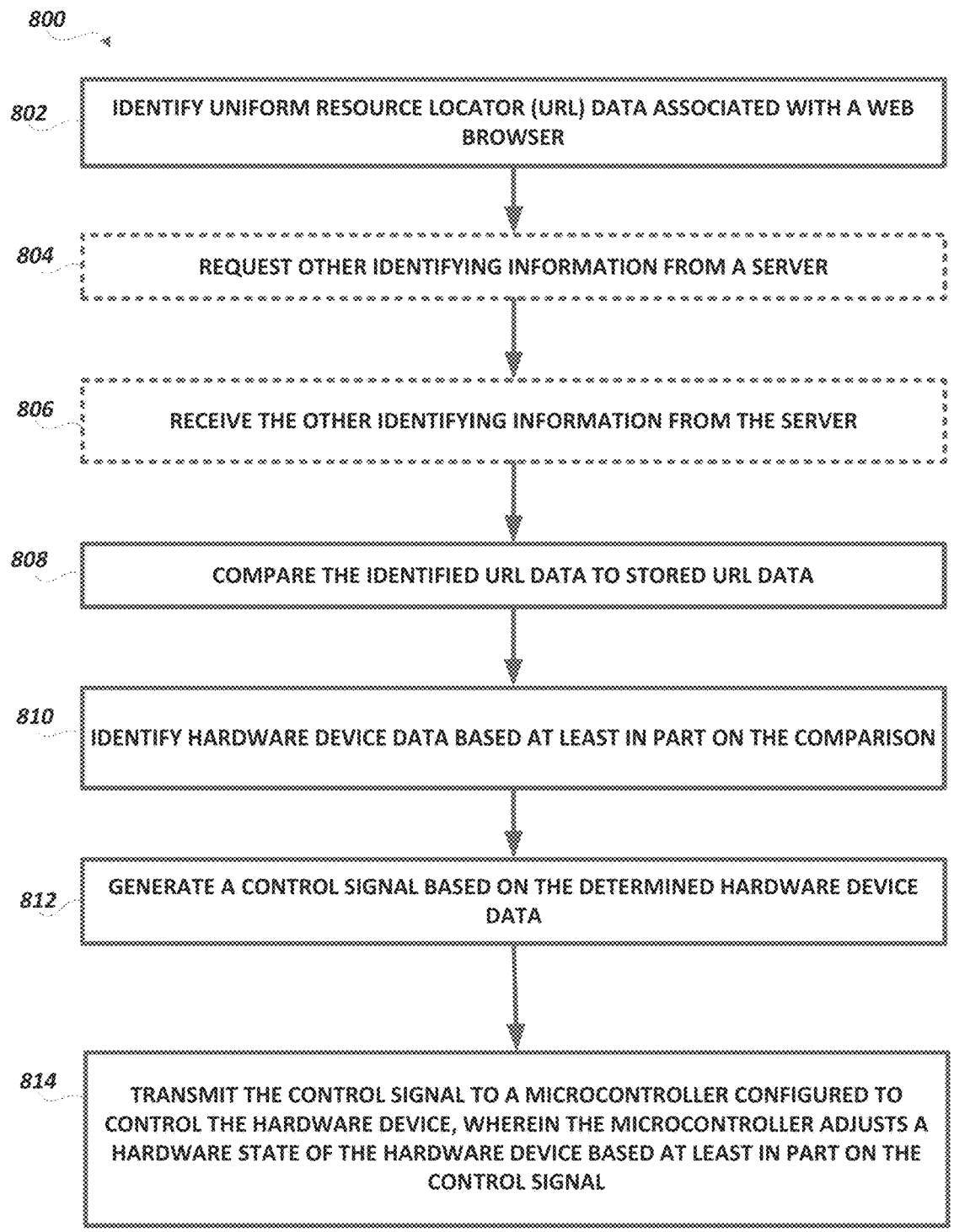
FIG. 8 is a flow diagram illustrative of an embodiment of a routine for controlling a hardware state input based at least in part on URL data.

FIG. 8 is a flow diagram illustrative of an embodiment of a routine for controlling a hardware state input based at least in part on URL data. One skilled in the relevant art will appreciate that the elements outlined for routine 800 may be implemented by one or many computing devices or components, such as a such computing device 210, and can be implemented in hardware or software (such as application 206), such as via computer executable instructions, a web browser extension, a web browser add-on, or computer application or program. Accordingly, routine 800 has been logically associated as being generally performed by the computing device 210, and thus the following illustrative embodiments should not be construed as limiting.

At block 802, the computing device identifies URL data associated with a URL in an Internet browser. For example, the computing device can periodically or continuously monitor a URL location, such as by monitoring an address bar associated with the browser, embedded data associated with the browser, HTTP cookies associated with the browser, or other URL identifying information.

At block 804, the computing device can request additional information from a server providing the URL. The additional information can include video data, such as video time stamp data. For example, a video may be associated with a URL location in that when a browser navigated to the URL location, the video will (or can) play. In some instances, hardware device data may be associated with URL data and/or a particular time stamp of the video. Accordingly, the computing device can request (for example, using an Application Programming Interface (API)) video information from the server. Video information can include, but is not limited to, a playback status (e.g., an indication of a percentage of the video that the player shows as buffered), whether the video has started, ended, is paused, is buffering, or is queued.

At block 806, the computing device can receive the additional information from the server and, in some example, can aggregate or combine it with the URL data to create new or additional URL data. In some cases, rather than requesting and receiving additional information from a server, the computing device may itself be able to determine the additional information. For example, if the video is stored on a medium such as Google Drive, the computing device may be able to access video information without having to make a request to the server.

At block 808, the computing device compares the identified URL data (and in some cases the additional data) with URL data stored (locally or remotely) in memory. For example, the computing device can compare the identified URL data with the various URL data stored thereon to identify a match (non-limiting examples: URL data value matches a stored URL data or falls within a stored range of URL data).

At block 810, based at least in part on the comparison, the computing device can identify hardware device data from memory. For example, a lookup table (sometimes referred to as a playlist) correlating hardware device data and URL data can be stored in memory. If the computing device determines that a match exists between the identified URL data and the stored URL data, the computing device can determine (for example, using the lookup table) hardware device data that corresponds to the identified URL data.

The computing device can compare identified URL data with stored URL data periodically (such as at a predetermined interval or at a predetermine frequency) or upon the occurrence of an event (non-limiting examples: a change in URL location, a browser leaves or navigates to a different URL location, a time period expires since a browser left or navigated to a URL location, a change in other URL data.)

At block 812, the computing device can generate a command (e.g., a control signal) based at least in part on the identified hardware device data. For example, the command can provide an indication of the hardware device data, such as an indication that one or more pins on the microcontroller should be enabled or disabled.

At block 814, the computing device communicates with the microcontroller communicate the generated command. The computing device and the microcontroller can communicate using various techniques. For example, the computing device and the microcontroller can communicate wirelessly (e.g., via a Bluetooth, Wi-Fi, or Cellular network) or through a wired connection (e.g., via serial port, USB, etc.).

The microcontroller can receive the command from the computing device, and based on the command can control the associated hardware device. For example, one or more hardware devices may be connected to various pins of the microcontroller. The microcontroller can receive the command from the computing device and can adjust a hardware state of one or more of its pins based on the command. By adjusting the hardware state of one or more of its pins (e.g., setting a pin high or low), the hardware device is controlled based on the URL data.

In some cases, the microcontroller can enable the hardware device to take one or more measurements or simply perform a function that the hardware device is designed to perform. For example, if the hardware device includes an LED, the action can include turning ON or OFF the LED or adjusting a brightness or intensity of the LED. As another example, if the hardware device includes a motor, the action can include causing the motor to turn on, speed up, or slow down. As another example, if the hardware device includes an MP3 or other media player, the action can include playing, pausing, or skipping a file (such as a song), or can include adjusting a volume or pairing the MP3 or other media player with another device (e.g., a Bluetooth speaker).

Depending on the embodiment, certain acts, events, blocks, or functions of any of the routine 800 can be performed in a different sequence, can be added, merged, or left out altogether (non-limiting example: not all described operations or events are necessary for the practice of the routine 800). In certain embodiments, operations or events can be performed concurrently, rather than sequentially.

Navigating to a URL Location Based on a Hardware Device Data

Figure 9:
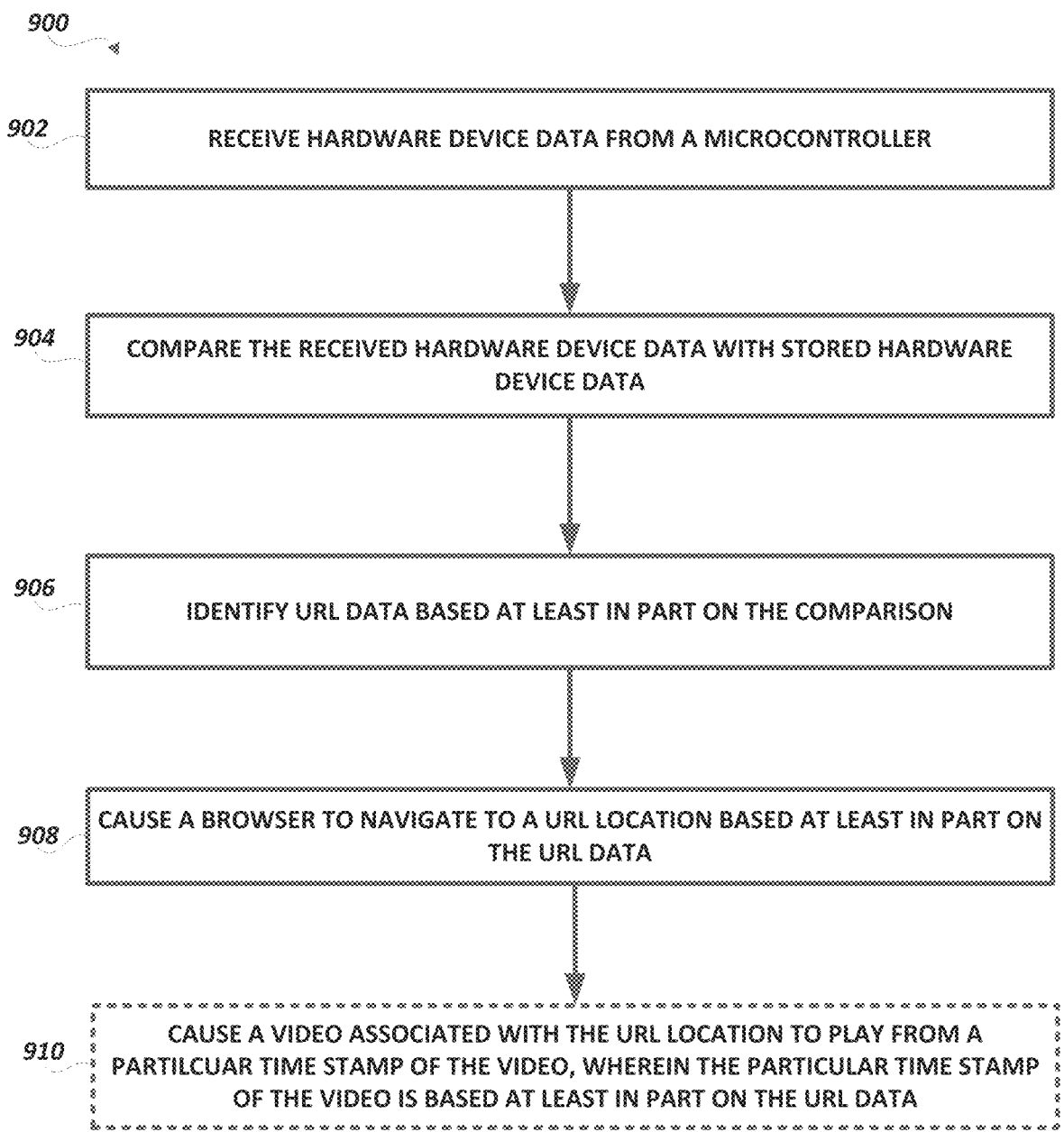
FIG. 9 is a flow diagram illustrative of an embodiment of a routine for navigating to a URL location based on hardware device data.

FIG. 9 is a flow diagram illustrative of an embodiment of a routine for navigating to a URL location based on hardware device data. One skilled in the relevant art will appreciate that the elements outlined for routine 900 may be implemented by one or many computing devices or components, such as a such computing device 220, and can be implemented in hardware or software (such as application 206), such as via computer executable instructions, a web browser extension, a web browser add-on, or computer application or program. Accordingly, routine 900 has been logically associated as being generally performed by the computing device 220, and thus the following illustrative embodiments should not be construed as limiting.

At block 902, a computing device receives the hardware device data from a microcontroller. The hardware device data can include data associated with one or more pins of the microcontroller. For example, as described herein, the microcontroller can include analog pins, digital pins, and other pins (e.g., indicating a protocol such as I2C protocol). Thus, the hardware device data can include an indication of whether a digital input is high or low, a value of one or more of the analog pins, etc. In some cases, the microcontroller reports hardware device data corresponding to each of its inputs and or outputs.

The computing device and the microcontroller can communicate using various techniques. For example, the computing device and the microcontroller can communicate wirelessly (e.g., via a Bluetooth, Wi-Fi, or Cellular network) or through a wired connection (e.g., via serial port, USB, etc.).

The microcontroller can transmit the hardware device data to the computing device periodically (such as at a predetermined interval), upon the occurrence of an event (non-limiting examples: a measurement initiated by a user, a change in hardware device data), or in response to receiving a request from the computing device. For example, At block 904, the computing device compares the identified hardware device data with hardware device data stored (locally or remotely) in memory. For example, the computing device can compare the identified hardware device data with the various hardware device data to identify a match (non-limiting examples: hardware device data value matches stored hardware device data or falls within a stored range of hardware device data).

At block 906, based at least in part on the comparison, the computing device can identify URL data from memory. For example, a lookup table (sometimes referred to as a playlist) correlating hardware device data and URL data can be stored in memory. If the computing device determines that a match exists between the identified hardware device data and the stored URL data, the computing device can determine (for example, using the lookup table) URL data that corresponds to the identified hardware device data.

At block 908, the computing device cause a browser to navigate to a URL associated with the identified URL data. In addition, in some cases, at block 910, the computing device can cause the video associated with the URL location to paly from a particular time stamp of the video. In some cases, this data can be integrated into the text of the URL, while in other cases it may corresponds to code embedded in the web page.

Depending on the embodiment, certain acts, events, blocks, or functions of any of the routine 800 can be performed in a different sequence, can be added, merged, or left out altogether (non-limiting example: not all described operations or events are necessary for the practice of the routine 800). In certain embodiments, operations or events can be performed concurrently, rather than sequentially.

Panning a Web-Based Map

As a non-limiting example, and with reference to FIG. 2, the environment 200 includes a computing device 210 configured to interact with a web mapping service and a microcontroller 220. The Internet provides access to many web mapping services (such as Google Maps) that allow a user to interact with a digital map, for example, by panning or zooming the digital map or selecting a location within the digital map. In some cases, a URL (or other URL data) associated with the digital map can provide an indication of a portion of the digital map that the user is viewing. For example, each coordinate on the digital map can be associated with a different URL (e.g., an indication of the coordinate (or user's selected point on the digital map) may be included in the text of the URL). Accordingly, as the user's selected point on the digital map changes, so might the text of the URL.

Similar to longitude and latitude coordinates, areas on the digital map that are close in proximity may have similar or closely connected URLs which may be grouped by a range of URLs. For example, the URL data associated each of the coordinates on a particular block or in a particular city, state, country, or the like, can be grouped together as a range of URL data. Accordingly, the URL data (e.g., text within a URL) can include an indication of a user's selected point on the digital map. Further, the URL data stored within memory can include a range of URL data (for example, associated with a particular region or location on the map).

In some cases, the computing device monitors URL data that provides an indication of the user's selected point on the digital map. The computing device compares at least a portion of the monitored URL data with URL data stored in memory to determine to determine if a match exists. In this example, the stored URL data includes a plurality of ranges associated with different areas or regions on the digital map, and the computing device determines that the monitored URL data matches or falls within one of the stored ranges. Based on the determined match, the computing device identifies hardware device data, and generates a command to communicate to the microprocessor. Continuing with this example, the command may cause an LED to activate on a physical map to indicate a region on the physical map that corresponds to the user's selected point on the digital map.

Similar to controlling a hardware device based on the panning on a web-based map, the computing device can also pan the web-based map based on hardware device data corresponding to a hardware device, such as a push button.

Video

As described herein, a video can be associated with a URL. For example, navigating to a specific webpage (such as within a video sharing website like YouTube) can cause a video to play in the browser. In some cases, in addition to the video itself, a URL can be linked to a specific part of a video. For example, rather than the video starting from the beginning, the URL can include timing data that can cause the video to begin playing at a specific time, indicated by the timing data. As a non-limiting example, if the URL includes "#t=1m16s", it may cause a video associated with that URL to begin playing 1 minute 16 seconds into the video. Accordingly, in some cases, a hardware device can be utilized to cause a video to play on a URL.

Similarly, in some case, timing associated with the video of a URL can cause the microcontroller to control a hardware device. For example, using an application-programming interface (API), the computing device can determine the timing of the video. Thus, in some cases, the URL data can include video time stamp data, and based at least in part on a video reaching a particular time stamp, the computing device can cause the hardware to perform an action (e.g., change a hardware state). For example, the video may be playing on the browser, and the computing device can determine that a user is currently 1 minute 16 seconds into the video. Thus, if the user pauses the video for a period of time (e.g., for 5 minutes), and then resumes the video, the computing device and/or the physical redirection device can, using URL data, determine an accurate timing of the video.

It should be noted that using URL data can be different from simply starting a timer once a video corresponding to a URL begins. For example, an LED can be set to turn on at 39 seconds into a specific video associated with a URL. If a timer was used, once the browser was navigated to the URL, the timer would start, under the assumption that the video also started. However, if the video was not playing (for example, because the video is buffering or because it was paused by a user), the LED would not necessarily turn on 1 minute 16 seconds into the video. Rather, the LED might turn on before or after the video reached 1 minute 16 seconds. In contrast, by monitoring the URL and turning on the LED based at least in part on URL data (e.g., when the URL data indicates the video is at 1 minute 16 seconds), the system can control the LED to achieve the desired result.

Online Slide Presentation

As another non-limiting example, in some cases, navigating an online slide presentation can cause a hardware device action. For example, for an online presentation application, such as Google Slides, each slide of the presentation is associated with a different URL. For example, a first slide corresponds to a first URL location, a second slide corresponds to a second URL location, and so on. Accordingly, as a presenter moves through the online presentation (e.g., changes from one slide to another slide), the computing device can monitor the changing URL location and, based at least in part on URL data, can send a control signal to the microcontroller, thereby causing an adjustment to a hardware device. Similarly, an input or output from a hardware device can cause the slides to change.

Classroom Project, Museum Exhibit, and Other Interactive Project Examples

The environments described herein can be utilized in various educational settings. For example, controlling an action of a hardware device based on URL data can be implemented in school projects, scientific demonstrations, museum exhibits, instructional systems, mapping technologies, or other educational medium. In addition, the concepts described herein extend far beyond educational settings, and can be utilized for concepts such as smart home, shopping, or other technology.

The various illustrative logical blocks, modules, and algorithm steps described in connection with the disclosure herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the disclosure herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microcontroller, but in the alternative, the processor can be a controller, microcontroller, or state machine, combinations of the same, or the like. A processor can include electrical circuitry configured to process computer-executable instructions. A processor may include an FPGA or other programmable device that performs logic operations without processing computer-executable instructions. A processor can also be implemented as a combination of computing devices, e.g., a combination of a DSP and a microcontroller, a plurality of microcontrollers, one or more microcontrollers in conjunction with a DSP core, or any other such configuration. A computing environment can include any type of computer system, including, but not limited to, a computer system based on a microcontroller, a mainframe computer, a digital signal processor, a portable computing device, a device controller, or a computational engine within an appliance, to name a few.

The steps of a method, process, or algorithm described in connection with the disclosure herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain examples include, while other examples do not include, certain features, elements and/or states. Thus, such conditional language is not generally intended to imply that features, elements and/or states are in any way required for one or more examples or that one or more examples necessarily include logic for deciding, with or without author input or prompting, whether these features, elements and/or states are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various examples, it will be understood that various omissions, substitutions, and changes in the form and details of the systems, devices or methods illustrated can be made without departing from the spirit of the disclosure. As will be recognized, certain examples described herein can be embodied within a form that does not provide all of the features and benefits set forth herein, as some features can be used or practiced separately from others.

The term "and/or" herein has its broadest, least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the foregoing disclosure has been described in terms of certain preferred examples, other examples will be apparent to those of ordinary skill in the art from the disclosure herein. Additionally, other combinations, omissions, substitutions and modifications will be apparent to the skilled artisan in view of the disclosure herein. Accordingly, the present invention is not intended to be limited by the description of the preferred examples, but is to be defined by reference to claims.

What is claimed is:

1. A system comprising:
    a data store storing a plurality of webpage manipulation instructions associated with a plurality of sensing device conditions, wherein based at least in part on an occurrence of a particular sensing device condition of the plurality of sensing device conditions, a processor is configured to control a web browser in accordance with a particular webpage manipulation instruction of the plurality of webpage manipulation instructions; and
    the processor configured to:
        obtain sensing data corresponding to a sensing device,
        determine an occurrence of a first sensing device condition associated with the sensing device based at least in part on the sensing data,
        consult the data store to identify a webpage manipulation instruction of the plurality of webpage manipulation instructions that is associated with the first sensing device condition, wherein the webpage manipulation instruction that is associated with the first sensing device condition is a first webpage manipulation instruction, and
        based on the occurrence of the first sensing device condition, control the web browser in accordance with the first webpage manipulation instructions;
    wherein the data store further associates a plurality of manipulation instructions, a plurality of webpage conditions, and a plurality of powered components, and wherein the processor is further configured to:
        monitor the web browser,
        determine an occurrence of a first webpage condition associated with the web browser,
        consult the data store to identify a first powered component and a first manipulation instruction associated with the first webpage condition, and
        based on the occurrence of the first webpage condition, communicate a control signal to the first powered component to cause the first powered component to behave in accordance with the first manipulation instruction; and
    wherein the first webpage condition occurs responsive to one or more of the web browser navigating away from a particular webpage and the web browser navigating to a particular webpage.

2. The system of claim 1, wherein the sensing device is a light sensor, a touch sensor, a temperature sensor, a voltage sensor, a current sensor, a humidity sensor, or a pH sensor.

3. The system of claim 1, wherein the sensing data is first sensing data, wherein the sensing device is a first sensing device, and wherein the processor is further configured to:
   obtain second sensing data corresponding to a second sensing device,
   determine an occurrence of a second sensing device condition associated with the second sensing device based at least in part on the second sensing data,
   consult the data store to identify a webpage manipulation instruction of the plurality of webpage manipulation instructions that is associated with the second sensing device condition, wherein the webpage manipulation instruction that is associated with the second sensing device condition is a second webpage manipulation instruction, and
   based on the occurrence of the second sensing device condition, control the web browser in accordance with the second webpage manipulation instruction.

4. The system of claim 1, wherein the sensing data corresponds to a measurement taken by the sensing device, wherein the first sensing device condition corresponds to a value of the measurement satisfying a threshold.

5. The system of claim 1, wherein the sensing data corresponds to a measurement taken by the sensing device, wherein the first sensing device condition corresponds to a change in a value of the measurement over a period of time by a particular amount.

6. The system of claim 1, wherein the sensing device is a pH sensor configured to obtain a pH measurement, wherein the first sensing device condition corresponds to at least one of a value of the pH measurement satisfying a threshold or a change in the value over a period of time by a particular amount.

7. The system of claim 1, wherein the first powered component comprises at least one of a light source, a motor, a camera, a servomechanism, a solenoid, a buzzer, an audio device, a microphone, or a sensor.

8. A method comprising:
   associating within a data store (a) webpage instructions and (b) sensor conditions, wherein a given webpage instruction is responsive to one or more the sensor conditions associated with that webpage instruction;
   associating within the data store (i) device instructions, (ii) webpage conditions, and (iii) powered components, wherein a given powered component is responsive to one or more of the device instructions associated with that powered component, and wherein one or more device instructions are responsive to one or more webpage conditions associated with those one or more device instructions;
   obtaining sensing data corresponding to a sensing device;
   determining an occurrence of a first sensing device condition associated with the sensing device based at least in part on the sensing data;
   identifying a first webpage instruction from the webpage instructions based at least in part on the first sensing device condition;
   causing a web browser to navigate to a first webpage based at least in part on the first webpage instructional;
   monitoring the web browser;
   determining an occurrence of a first webpage condition associated with the web browser, wherein the first webpage condition occurs responsive to at least one of the web browser navigating to a particular webpage and the web browser navigating to a particular webpage;
   identifying a first powered component and a first device instruction associated with the first webpage condition; and
   based on the occurrence of the first webpage condition, communicating a control signal to the first powered component to cause the first powered component to behave in accordance with the first device instruction.

9. The method of claim 8, wherein said identifying the first webpage instruction comprises consulting the data store to identify a webpage instruction of the webpage instructions that is associated with the first sensing device condition, wherein the data store associates the webpage instructions with a sensing device conditions.

10. The method of claim 8, wherein the sensing device is a light sensor, a touch sensor, a temperature sensor, a voltage sensor, a current sensor, a humidity sensor, or a pH sensor.

11. The method of claim 8, wherein the sensing data is first sensing data, wherein the sensing device is a first sensing device, and wherein the method further comprises:
   obtaining second sensing data corresponding to a second sensing device;
   determining an occurrence of a second sensing device condition associated with the second sensing device based at least in part on the second sensing data;
   identifying a second webpage instruction from the webpage instructions based at least in part on the second sensing device condition; and
   causing the web browser to navigate to a second webpage based at least in part on the second webpage instruction.

12. The method of claim 8, wherein the sensing data corresponds to a measurement taken by the sensing device, wherein the first sensing device condition corresponds to at least one of a value of the measurement satisfying a threshold or a change in the value of the measurement over a period of time by a particular amount.

13. A non-transitory computer-readable storage medium storing computer-executable instructions that when executed by one or more processors cause the one or more processors to:
   associate within a data store (a) webpage instructions and (b) sensor conditions, wherein a given webpage instruction is responsive to one or more the sensor conditions associated with that webpage instruction;
   associate within the data store (i) device instructions, (ii) webpage conditions, and (iii) powered components, wherein a given powered component is responsive to one or more of the device instructions associated with that powered component, and wherein one or more device instructions are responsive to one or more webpage conditions associated with those one or more device instructions;
   obtain sensing data corresponding to a sensing device;
   determine an occurrence of a first sensing device condition associated with the sensing device based at least in part on the sensing data;
   identify a first webpage instruction from the webpage instructions based at least in part on the first sensing device condition, and
   cause a web browser to navigate to a first webpage based at least in part on the first webpage instruction;
   monitor the web browser;
   determine an occurrence of a first webpage condition associated with the web browser, wherein the first webpage condition occurs responsive to at least one of the web browser navigating to a particular webpage and the web browser navigating to a particular webpage;

identify a first powered component and a first device instruction associated with the first webpage condition; and based on the occurrence of the first webpage condition, communicate a control signal to the first powered component to cause the first powered component to behave in accordance with the first device instruction.

14. The non-transitory computer-readable storage medium of claim 13, wherein to identify the first webpage instruction, the computer-executable instructions cause the one or more processors to consult the data store to identify a webpage instruction of the webpage instructions that is associated with the first sensing device condition, wherein the data store associates the webpage instructions with sensing device conditions.

15. The non-transitory computer-readable storage medium of claim 13, wherein the sensing device is a light sensor, a touch sensor, a temperature sensor, a voltage sensor, a current sensor, a humidity sensor, or a pH sensor.

16. The non-transitory computer-readable storage medium of claim 13, wherein the sensing data is first sensing data, wherein the sensing device is a first sensing device, and wherein the computer-executable instructions further cause the one or more processors to:

obtain second sensing data corresponding to a second sensing device, determine an occurrence of a second sensing device condition associated with the second sensing device based at least in part on the second sensing data, identify a second webpage instruction from the webpage instructions based at least in part on the second sensing device condition, and cause the web browser to navigate to a second webpage based at least in part on the second webpage instruction.

17. The non-transitory computer-readable storage medium of claim 13, wherein the sensing data corresponds to a measurement taken by the sensing device, wherein the first sensing device condition corresponds to at least one of a value of the measurement satisfying a threshold or a change in the value of the measurement over a period of time by a particular amount.

* * * * *